United States Patent [19]
Andersen et al.

[11] Patent Number: 5,181,572
[45] Date of Patent: Jan. 26, 1993

[54] FARM IMPLEMENT ROW GUIDANCE DEVICE

[76] Inventors: Eugene C. Andersen, R.R. 2, Sheldon, Mo. 64784; Gary W. Balk, Rt. 3, Nevada, Mo. 64772

[21] Appl. No.: 811,953

[22] Filed: Dec. 23, 1991

[51] Int. Cl.⁵ .............................................. A01B 69/06
[52] U.S. Cl. .......................................... 172/6; 172/5; 56/10.2
[58] Field of Search .............. 172/5, 6, 26, 272, 450; 171/9; 104/244.1; 56/10.2; 280/412, 413, 479.1; 180/131

[56] References Cited

U.S. PATENT DOCUMENTS

| | | | |
|---|---|---|---|
| 2,727,756 | 12/1955 | Carlile | 172/450 X |
| 3,425,715 | 2/1969 | Weitz | 172/450 X |
| 3,807,769 | 4/1974 | Thompson et al. | 172/272 |
| 4,616,712 | 10/1986 | Jorgensen | 172/6 |
| 4,930,581 | 6/1990 | Fleischer et al. | 172/6 |

FOREIGN PATENT DOCUMENTS

| | | | |
|---|---|---|---|
| 247922 | 3/1963 | Australia | 172/450 |
| 565084 | 10/1958 | Canada | 172/450 |
| 2939987 | 4/1980 | Fed. Rep. of Germany | 172/5 |
| 1253132 | 12/1960 | France | 172/6 |
| 411793 | 10/1974 | U.S.S.R. | 172/5 |

OTHER PUBLICATIONS

Orthman Manufacturing, Inc. brochure entitled "Computerized Quick Hitch Guidance System".

*Primary Examiner*—Randolph A. Reese
*Assistant Examiner*—Jeffrey L. Thompson
*Attorney, Agent, or Firm*—Hovey, Williams, Timmons & Collins

[57] ABSTRACT

An improved apparatus (62) for on-the-go lateral adjusting of a field implement (10) is provided, and is especially useful for a pull-behind, tractor-mounted implement (10) designed to operate on or between rows (30) of a crop (32). The apparatus (62) includes a sensing assembly (64) having lowermost feelers (70, 72) designed to detect the position of the implement (10) relative to generally parallel crop rows (30), along with implement adjusting structure (66) and a hydraulic control assembly (68). The adjusting structure (66) is preferably in the form of a piston and cylinder assembly (104) pivotally coupled between the draw bar (14) of a tractor (12) and one of the three point hitch arms (16) thereof. The control assembly (68) is in the form of a solenoid-operated hydraulic valve (128) interposed between the hydraulic system of the tractor (12) and the cylinder (106) of piston/cylinder assembly (104). In use, when the feelers (70, 72) detect that implement (10) is misaligned relative to crop rows (30), the valve (128) is actuated to operate assembly (104) and thereby laterally shift the hitch arms (16); this in turn acts to lead the entire implement (10) back into proper alignment between the rows (30).

8 Claims, 3 Drawing Sheets

Fig.2.
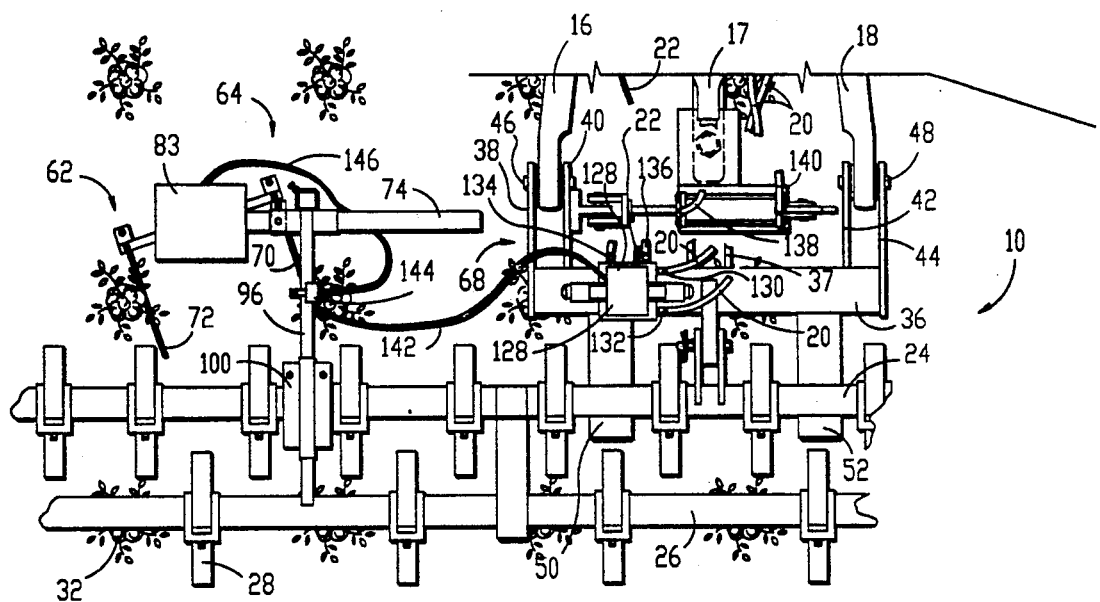
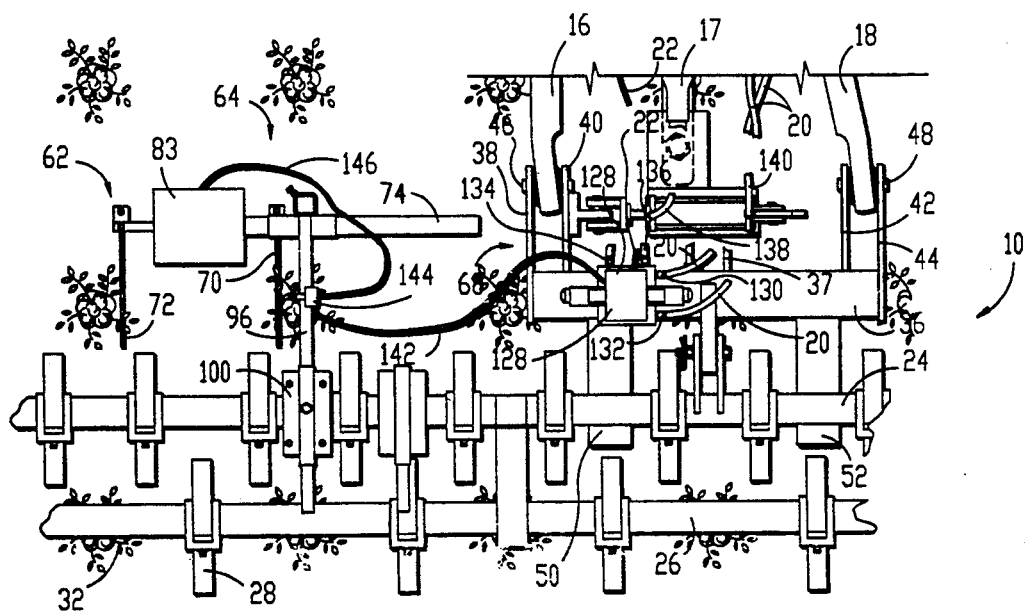
Fig.3.

FARM IMPLEMENT ROW GUIDANCE DEVICE

BACKGROUND OF THE INVENTION

1. Field of the Invention

The present invention is broadly concerned with guidance apparatus for field implements so as to quickly and precisely adjust the lateral position of the implement in the event that the implement becomes misaligned with the field rows during travel therealong. More particularly, it is concerned with such a row guidance device adapted for use with pull-behind implements coupled to swayable tractor hitch arms, wherein the guidance apparatus has row sensing means and a motive assembly for selective, lateral, momentary shifting of the hitch arms; in this fashion, the shifted hitch arms serve to lead the misaligned implement back into proper alignment with the crop rows.

2. Description of the Prior Art

It is often necessary during a growing season to cultivate the earth between row-planted crops. Many field implements have been devised for effecting such cultivation and generally include a plurality of laterally spaced apart ground-working tools designed to till or otherwise work the soil between growing rows of crop. In order to be most effective, it is of course necessary that such row implements be guided so as to insure that the ground-working tools thereof are maintained in proper position between crop rows; otherwise, the attempted cultivation may lead to unintended crop destruction. This need is particularly acute in the case of pull-behind implements which are attached to the three point hitch arms of a tractor. In such cases the tractor driver may find it extremely difficult to maintain proper implement position relative to the crop rows as the tractor and implement traverse the field. Actual field operations reveal that lateral shifting of the rear wheels of a tractor independent of front wheel steering can occur, resulting in a crabbing motion over which the tractor operator has little control. This is a particularly frustrating problem with four wheel drive tractors which are steered by means of a central pivot mechanism. Major causes of each lateral crabbing motion are ruts resulting from previous field operations such as planting, ridges resulting from ridge till farming, and slopes on hillsides or terraces.

Other types of field implements designed to operate on or around generally parallel field rows, such as planters or applicators, also benefit from row guidance and adjustment. Here again, failure to properly maintain the position of the implement relative to the crop rows can lead to crop destruction or wastage of applicator products.

A number of guidance devices have been proposed in the past effecting selective, on-the-go adjustment of pull-behind field implements. Many of these guidance devices are designed to achieve implement adjustment by pivoting of the implement about an upright axis. Experience has proved, however, that such pivot-type adjustment devices do not generally accomplish implement adjustment with sufficient rapidity, and as a consequence crop may be destroyed. It has also been known in the past to provide guidance mechanism which laterally translates the implement, as opposed to pivoting thereof. However, these prior mechanisms have proved to be extremely cumbersome and costly, owing to the need for heavy-duty cylinders and supports required for lateral translatory movement of heavy implements.

SUMMARY OF THE INVENTION

The present invention overcomes the problems outlined above and provides a greatly improved apparatus for adjusting the lateral field row position of a pull-behind field implement coupled to the three point hitch arms of a tractor. Broadly speaking, the implement-adjusting apparatus includes structure for sensing the position of the implement relative to the rows and for effecting adjustment of the implement in response to position sensing; to this end, the apparatus of the invention includes a motive assembly which is coupled (either directly or indirectly) to a hitch arm for selective, lateral, momentary movement of the arms, with the later being permitted to freely sway. In this fashion, the shifted hitch arms serve to quickly lead the implement back into proper alignment between field rows. An important principle of the present invention stems from the fact that the guidance system of the invention is capable of compensating for the lateral movement of a tractor with the implement maintaining its direction regardless of such lateral movement.

In more detail, the adjusting apparatus includes sensing means in the form of a pair of spaced apart row sensing feelers or wands which are oriented to travel close to the earth and, in the case of row crops, to be oriented between an adjacent pair of rows with each proximal to a respective row. The feelers are in turn pivotally secured to a transverse support, the latter having an upstanding, axially pivotal shaft. In the event that the feelers encounter growing crop for example, the upright shaft is correspondingly pivoted. Means is provided for determining the direction of such pivoting, preferably in the form of a pair of laterally spaced apart switches and means carried by the shaft for respective switch engagement.

A piston and cylinder assembly is provided for hitch arm movement, with the assembly including an extensible piston rod connected to the hitch arm. Such attachment may be direct, or more preferably through the medium of a quick-attach bar secured to the outer ends of the hitch arms. When implement misalignment is sensed, the piston rod is either extended or retracted as necessary, in order to quickly lead the implement back into alignment. Upon extension or retraction of the rod, corresponding lateral translatory movement of the implement occurs. In particularly preferred forms, the base end of the piston and cylinder assembly is connected to the draw bar of the tractor. It has been found that a relatively low pressure (e.g., 500 psi), medium duty piston and cylinder assembly can be employed. Moreover, a relatively slight shifting of the hitch arms effects a significantly larger lateral shifting of the implement. In one case, hitch arm lateral movement of one-half inch resulted in a rapid two inch lateral shifting of the pull-behind implement.

In order to achieve the necessary interconnection between the sensing means and piston and cylinder assembly, the former is electrically connected with an electric, solenoid-operated hydraulic valve coupled between the hydraulic system of the tractor and the assembly cylinder. Thus, upon closing of a sensing switch as described, hydraulic oil is directed to the cylinder in order to effect extension or retraction thereof as required for implement adjustment.

BRIEF DESCRIPTION OF THE DRAWINGS

FIG. 2 is a view similar to that of FIG. 1 but showing the orientation of the implement with the ground-working tools thereof misaligned, and also illustrating operation of the row sensing apparatus;

FIG. 3 is a view similar to that of FIG. 2, and illustrating the implement in an adjusted position with the ground-working tools thereof again between adjacent crop rows;

DESCRIPTION OF THE PREFERRED EMBODIMENT

Figure 1:
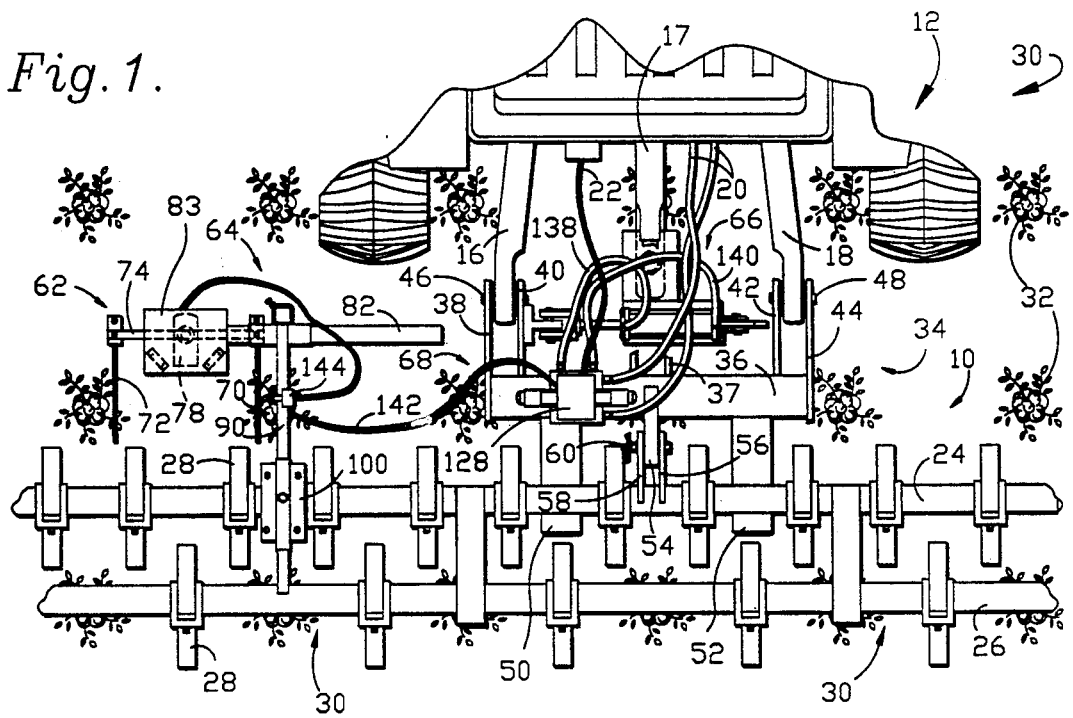
FIG. 1 is a plane view illustrating a pull-behind row cultivator implement operatively connected to the hitch of a tractor and equipped with the row guidance apparatus of the invention.

Turning now to the drawings, and particularly FIG. 1, a pull-behind field cultivator 10 is illustrated, coupled with a tractor 12. Specifically, the tractor 12 includes a stationary draw bar 14, as well as swayable hitch arms 16, 17, 18 forming a part of the usual three-point hitch of the tractor. It is important that the arms 16-18 be allowed to sway freely, and therefore use is not made of anti-sway blocks or similar expedients for preventing lateral arm movement. Moreover, the tractor includes the usual hydraulic lines 20 and electrical power line 22.

The cultivator 10 includes a pair of spaced apart, essentially parallel fore and aft tool bars 24, 26 each supporting a plurality of earth-working tools 28. As illustrated, the tools 28 are located to pass between substantially parallel rows 30 of crop 32, so as to cultivate the earth between the rows while leaving the growing crop undisturbed. Interconnection between the cultivator 10 and tractor 12 is effected by means of a somewhat U-shaped quick-attach assembly 34 having a transversely extending bar 36 having a central hitch arm connector 37 as well as two depending legs 37a, 37b each having a pair of forwardly extending, apertured plates 38, 40 and 42, 44. As illustrated, the plate pair 38, 40 is adapted to receive the end of swayable hitch arm 16 (see FIG. 7), with a quick-connect pin 46 used to interconnect the same. Similarly, the plate pair 42, 44 receives swayable hitch arm 18 therebetween, with a pin 48 being used for interconnection purposes. The remaining hitch arm 17, although shown fragmentarily in FIG. 1, is adapted for a similar quick attachment to connector 37.

In order to provide the necessary interconnection between the assembly 34 and cultivator 10, the bar 36 is equipped with a total of three hitch elements, namely a pair of lower hitch elements 50, 52, and an upper, central, apertured hitch connector 54. As illustrated, the tool bar 24 is equipped with a pair of spaced apart, upstanding, apertured plates 56, 58, adapted to receive therebetween the hitch connector 54; a connecting pin 60 is used to couple the connector 54 with plates 56, 58. On the other hand, the hitch elements 50, 52 are quick-coupled to tool bar 24 by any convenient means.

As explained, in the use of a field cultivator such as that depicted in the drawings, it is important to guide the implement as the row crop is traversed, so as to prevent unintended crop destruction by virtue of deviation of the implement from its intended path of travel. To this end, implement-adjusting apparatus 62 is provided, which broadly includes a sensing assembly 64, implement adjusting structure 66 and a control assembly 68 interconnecting the sensing means 64 and structure 66.

Figure 4:
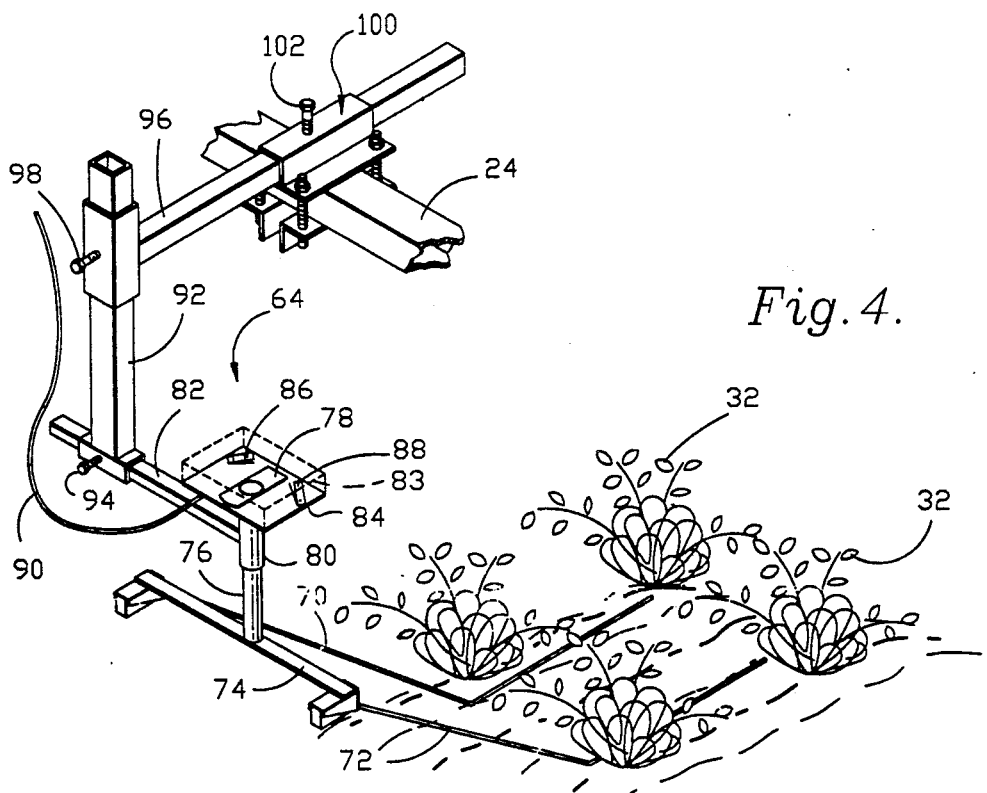
FIG. 4 is a fragmentary, isometric view illustrating in more detail the preferred sensing apparatus of the invention.
Figure 6:
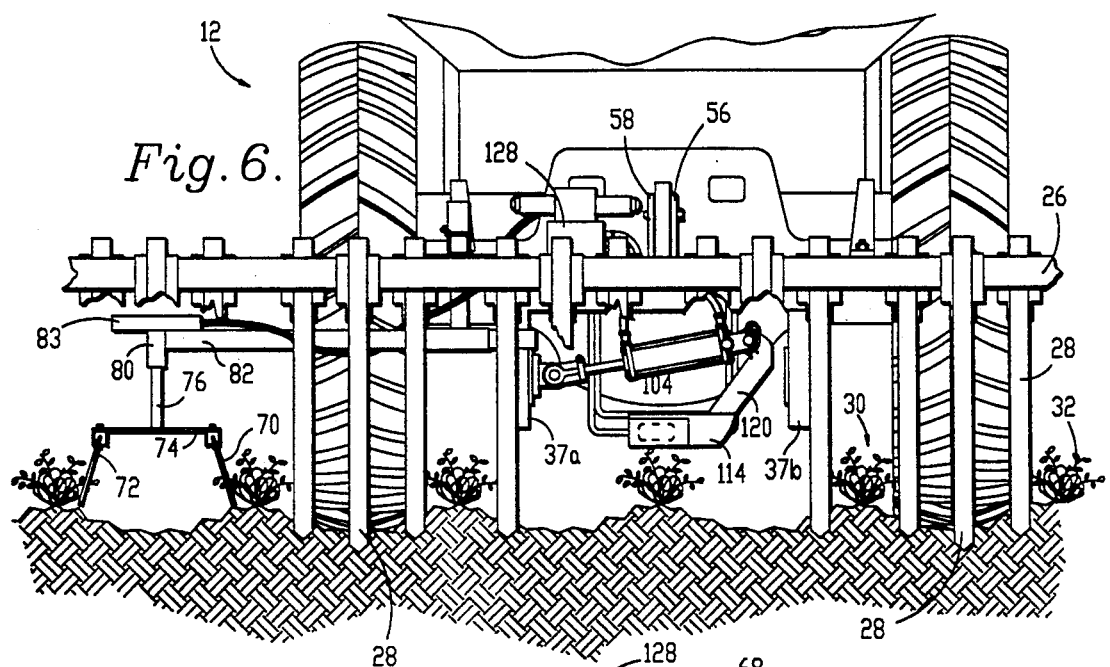
FIG. 6 is a rear view of the tractor/implement apparatus depicted in FIG. 1, and also showing the adjusting apparatus operatively coupled with the tractor and implement.
Figure 5:
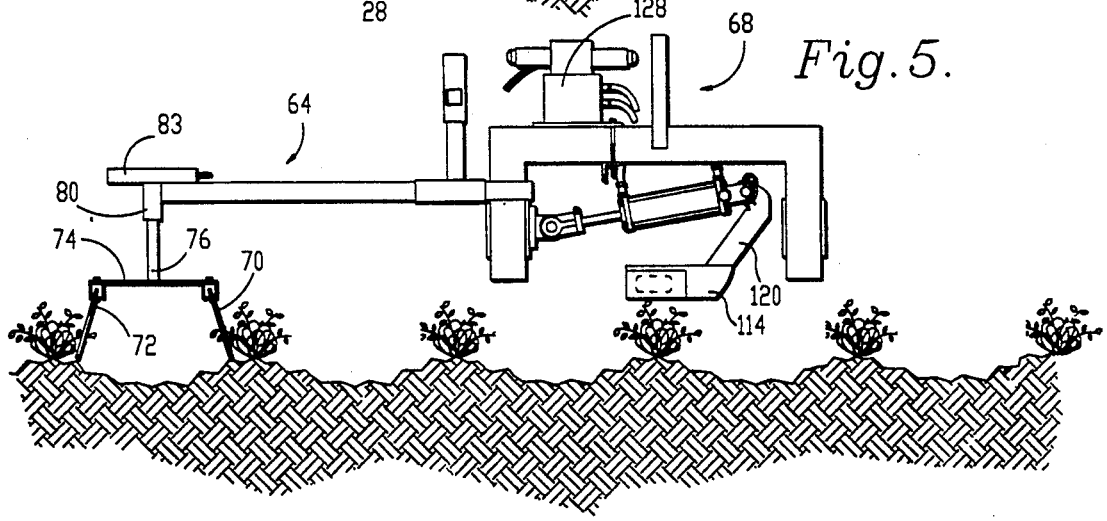
FIG. 5 is a fragmentary rear view illustrating the spatial orientation of the sensing apparatus and implement-adjusting mechanism of the invention.

In more detail, the sensing assembly 64 includes a pair of laterally spaced apart, elongated, somewhat V-shaped wands or feelers 70, 72 which are oriented to pass between a pair of adjacent rows 30. The lower, generally horizontal portions of each of the feelers 70, 72 are adapted to closely overlie the earth as best seen in FIG. 4. The upper ends of the feelers 70, 72 are connected to a transverse support 74 by means of independent pivotal connections, so as to allow independent vertical movement of each rod, thereby canceling the effect of uneven or rough ground and trash or ground cover. The support 74 includes a central, upstanding shaft 76 carrying, adjacent its uppermost end, a switch-engaging plate 78. The shaft 76 is pivotally received within an upright, hollow tube 80, the latter being connected to a connection arm 82. In addition, the tube 80 supports a rectangular housing 83 having a horizontal base 84 as best seen in FIG. 4, with the switch-engaging plate 78 being shiftable on the upper surface of the base 84. Finally, a pair of normally open, push-button, lever operated microswitches 86, 88 which are powered by the electrical system of the tractor via electrical line 90.

Interconnection between the sensing assembly 64 and cultivator 10 is afforded by means of a first upstanding connection leg 92 secured to arm 82 via set screw 94. A rearwardly extending connection arm 96 is in turn secured to leg 72 by means of set screw 98. Finally, a multiple-piece bracket 100, secured to arm 96 by means of set screw 102, serves to connect arm 96 to forward tool bar 24 of cultivator 10.

Adjusting structure 66 includes a double acting piston and cylinder assembly 104 including hydraulic cylinder 106 and extensible piston rod 108. The inboard base end of cylinder 106 includes a clevis 110, whereas the outermost end of rod 108 is likewise equipped with a clevis 112.

Figure 7:
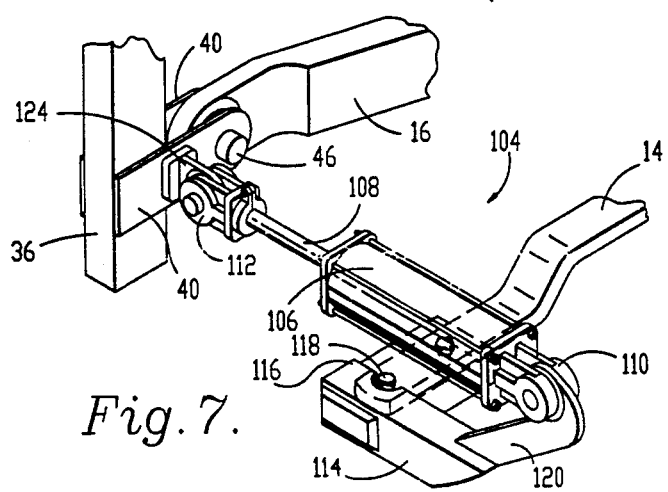
FIG. 7 is a fragmentary, isometric view illustrating the piston and cylinder assembly connected between the tractor draw bar and one of the tractor hitch arms.

The assembly 104 is secured to tool bar 14 as best seen in FIG. 7. To this end, a bracket 114 is provided including an angled, lowermost, tubular component 116 adapted to receive tool bar 14 and be releasably secured thereto by means of bolts 118. The bracket 114 further includes an upstanding, obliquely oriented component 120 having an apertured uppermost end; a conventional ball joint (not shown) serves to pivotally secure the base end of cylinder 106 to component 120.

Again referring to FIG. 7, it will be observed that plate 40 includes an inwardly extending, apertured tang 124. Another conventional ball joint (not shown) is used to pivotally couple clevis 112 to tang 124.

The control assembly 68 includes a solenoid operated hydraulic valve 128 which is situated atop bar 36 and has a pair of hydraulic fluid inlets 130, 132 as well as a pair of hydraulic fluid outlets, 134, 136 (see FIG. 2). The tractor hydraulic lines 20 are coupled to the inlets 130, 132, whereas the outlets 134, 136 are connected via hydraulic lines 138, 140 to the opposite ends of cylinder 106. Also as shown, the tractor electrical power line 22 is routed to the valve assembly 128. Another power line 142 extends from the valve 128 to a normally open, push-button, lever-operated centering switch 144 mounted on arm 96. Another line 146 extends from switch 144 to housing 83 where an electrical connection is made with the respective microswitches 86, 88 therein.

Attention is next directed to FIG. 1, which depicts the cultivator 10 as it travels along the length of the generally parallel rows 30 of crop 32. It will be observed in this orientation that the tools 28 lie between adjacent rows 30, in order to properly perform their cultivation task. In such orientation, the switch-engaging plate 78 of the sensing assembly 64 is centered and out of engagement with the microswitches 86, 88.

FIG. 2 depicts a situation wherein, for whatever reason, the cultivator 10 begins to wander leftwardly such that the tools 28 begin to contact and uproot the crop 32. When this occurs, as shown in FIG. 2, the feelers 70, 72 encounter crop plants 32 (or the ridges of earth surrounding the bases of the plants), with the result being that shaft 76 and plate 78 are pivoted in a counterclockwise direction. This causes the plate 78 to engage microswitch 86, closing the switch contacts and causing electrical current to pass to the valve 128. As a consequence, pressurized oil, supplied from the tractor's hydraulic system, is directed via valve output line 138 to the forward end of cylinder 106. This causes the piston within the cylinder 106 to retract rightwardly as viewed in FIG. 2, thereby retracting the piston rod 108. Accordingly, the associated hitch arm 16 is immediately pulled rightwardly (which of course causes a similar movement of hitch arm 18), thereby rapidly leading and translating the cultivator 10 rightwardly until the cultivator again assumes its proper position with the implements 28 thereof oriented between the rows 30. As soon as the cultivator 10 has been moved a sufficient distance to remove the pressure on the feeler 72, the plate 78 rotates back to its centered position, breaking the contact with microswitch 86, thus closing the hydraulic valve solenoid so that no more oil flows to or from cylinder 106.

Of course, in the event that cultivator 10 would wander rightwardly as viewed in FIG. 2, the opposite sequence would occur, the feelers 70, 72 would cause the plate 78 to close microswitch 84, thereby energizing valve 128 to direct pressurized hydraulic fluid via line 140 to the base of cylinder 104, thereby extending rod 108 and shifting the hitch arm 16 leftwardly to correct the wander.

The centering switch 144 is basically an on-off switch for the control assembly 68. Thus, the switch 144 is constructed so that when the tools 28 are out of working position in the soil, the centering switch is released to its open position, thereby cutting off electrical power to the shift microswitches 86, 88.

Solenoid valve 128 is so constructed that when the cultivator 10 is lifted out of its working position, electrical current is shut off via opening of centering switch 144. The cultivator then self-centers with relation to the tractor, by virtue of the dampening effect of the flow of oil from the rod end of the cylinder through the solenoid valve to the base end of the cylinder. As a consequence, the invention provides essentially automatic implement centering, which has been a problem with prior guidance devices.

As illustrated in the drawings, it has been found that the row sensing assembly 64 is best positioned just outside of a tractor tire. For some crops, fields with trash, big clogs or possibly dense weed conditions, it may be best to set the row unit of a single row and turn the feelers 70, 72 inward until there is about a two inch space between them. It has also been found that another set of feelers, with a "Z" configuration that is bent outwardly and then back inwardly may give best results in such field conditions.

We claim:

1. Apparatus for adjusting the position of a field implement assembly including a ground-working implement operably coupled to laterally spaced apart swayable hitch arms, the ends of said arms remote from said implement being swayably connected to a tractor for pulling the assembly along generally parallel field rows, said tractor including a draw bar separate from and between said arms, said apparatus comprising:

means for sensing the position of said ground-working implement relative to said rows as said assembly is pulled therealong;

means for operably coupling said sensing means to said ground-working implement; and adjusting structure operatively connected with said sensing means and responsive to said sensing means for adjusting the position of said field implement assembly, said adjusting structure comprising a selectively actuatable piston and cylinder assembly including a cylinder and a shiftable piston rod extending from one end of said cylinder, bracket means operably coupled to said draw bar and including an upright segment extending above the draw bar, first ball joint means supported on said upright segment and located above said draw bar for coupling one of said cylinder and piston rod to said upright segment between said swayable arms, and second ball joint means mounting the other of said cylinder and piston rod to said field implement assembly, said piston and cylinder assembly being operable upon actuation thereof in response to said sensing means for lateral movement of said field implement assembly to effect adjustment of said ground-working implement, 2. The adjusting apparatus of claim 1, said sensing means comprising a pair of spaced apart row sensing feelers, and upright, axially pivotal element, means coupling said feelers to said element, and means for determining the direction of pivoting of said element.

3. The adjusting apparatus of claim 2, said direction-determining means comprising a pair of laterally spaced apart switches, and means carried by said element for respectively engaging said switches upon rotation of the element.

4. The adjusting apparatus of claim 1, there being an interconnecting implement adapter for connection between said hitch arms and implement, said rod-connecting means being securable to said implement adapter.

5. The adjusting apparatus of claim 1, said cylinder being coupled to said upright segment, and said piston rod being coupled to said field implement assembly.

6. The adjusting apparatus of claim 1, said upright segment being obliquely oriented.

7. The adjusting apparatus of claim 1, said second ball joint means mounting the other of said cylinder and piston rod to said swayable hitch arms.

8. The adjusting apparatus of claim 1, said tractor including a hydraulic system, there being a hydraulic valve operably coupled to said piston and cylinder assembly and adapted for connection to said tractor hydraulic system, and means for shut off of said valve upon elevation of said ground-working implement out of the earth.

* * * * *